ately over controllable distances, as well as locking of
United States Patent

Witzig et al.

[11] 3,740,806
[45] June 26, 1973

[54] AUTOMATIC TOOL MACHINE HAVING A MULTI-POSITION INDEXING ARRANGEMENT

[76] Inventors: Emil Karl Witzig, Stuttgart-Weilimdorf; Rudolf Frank, Ludwigsburg, both of Germany

[22] Filed: Mar. 2, 1971

[21] Appl. No.: 120,111

[52] U.S. Cl. .......... 29/38 C, 74/813 L, 74/815, 74/826, 408/71, 269/20, 269/57
[51] Int. Cl. .......... B23b 39/20, B23b 39/22
[58] Field of Search .......... 408/71; 29/38 C; 269/20, 57, 65; 279/5; 74/815, 826, 813 L

[56] References Cited
UNITED STATES PATENTS
1,670,287   5/1928   Stickney .......... 29/38 C

*Primary Examiner*—Francis S. Husar
*Attorney*—Flynn & Frishauf

[57] ABSTRACT

To selectively position a workpiece in indexed position with respect to machine tool heads, a carrier is mounted for rotational movement in an elongated hollow body 7, rotation being transmitted by a shaft 8 placed in approximate indexed alignment by means of inclined spline threads formed thereon which engage a longitudinally moving nut 17. Accurate index positioning is obtained by radially aligned profile positioning faces 30, 31, 32 secured to elements cooperating with the hollow body 7 and the shaft 8, engagement of the profiled faces locking the workpiece carrier in properly indexed position. Movement of the spindle nut, preferably over controllable distances, as well as locking of the shaft in position is obtained by hydraulic cylinder-piston arrangements.

20 Claims, 11 Drawing Figures

United States Patent [19]
Witzig et al.
[11] 3,740,806
[45] June 26, 1973
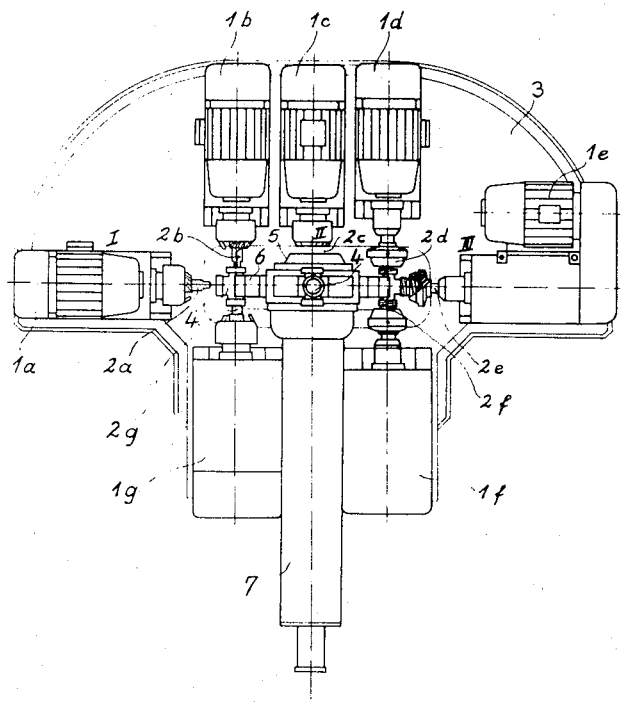

PATENTED JUN 26 1973 3,740,806

AUTOMATIC TOOL MACHINE HAVING A MULTI-POSITION INDEXING ARRANGEMENT

The present invention relates to automatic machine tools, and more particularly to automatic tool machinery in which a work piece, or machine heads, can be indexed to various positions for carrying out various machining operations on a work piece.

In the specification herein reference will be made to indexing the work piece to selected positions, in steps, so that the work piece, secured to a tool carrier, such as a chuck can be selectively worked by various tool heads having suitable feed arrangement. The invention is, of course, equally applicable to machine tools in which the positioning of work piece and working tool, with respect to each other, is reversed, so that a fixed work piece is sequentially operated on by various tools.

Step-wise indexing of an indexing table, or turret, or an indexing drum has, in accordance with a known arrangement, been carried out by means of a Geneva movement. The Geneva movement is preferably located immediately adjacent the indexing drum, or indexing carrier. The inertia of the indexing drum, or carrier affects the indexing time; in order to decrease the stepping time of the indexing arrangement, the mass of the drum should be held as low as possible. This requires a compromise which is difficult to achieve effectively, since the size of the Geneva movement then has to be limited to undesirable small values in order to be able to fit the indexing mechanism into the apparatus. If the size of the Geneva movement is decreased, the accuracy of the index positioning suffers. For this reason, automatic turret machine tools and the like have been proposed in which the indexing drum, or head is located on a fairly long, rotatable shaft which is coupled at its end with the Geneva movement, so that the Geneva movement itself is located beyond the location of the driven machine tool head. The size of the Geneva movement, thus, is not limited to the diameter required by the first-mentioned machine tool construction, in which the presence of such operating heads as drills, bores, thread cutters, and the like limit the placement of the Geneva movement. The remotely located Geneva movement can thus be made sufficiently large to provide for accurate indexing of the work piece, while, simultaneously, providing for low mass of the work carrier head so that indexing movement can be rapid.

Automatic tool machines of this type provide for effective operation; it has, however, been found in several cases that the housing enclosing the Geneva movement, although located well behind the operating heads, may reach an undesirable large size. Projecting housing portions, to enclose the Geneva movement interfere with freedom of location of the machine tool head, thus limiting the particular indexing arrangement, and the machine tool, in the flexibility of carrying out desired operations.

It is an object of the present invention to provide a machine tool, and more particularly an automatic tool machine having an indexing arrangement in which the mass being moved, including the mass of the work piece carrier can be held to be low, so that high indexing speed can be obtained, which has a smooth outer housing permitting ready placement of working heads, as desired, and which provides for accurate indexing and relative positioning of the work piece and the machine tools. Additionally, the construction should be such that it is simple to make, reliable, and provides the desired accuracy with sturdy and yet simple means.

Subject matter of the present invention: Briefly, to selectively align a working head and a work piece, a carrier is provided rotatably secured on a shaft which is placed in an elongated hollow body. The shaft is provided with operating means acting thereon to cause relative rotation of the shaft with respect to the elongated hollow body over a limited angular distance, and releasable alignment and centering means interconnect the carrier and the hollow body to then exactly position the work piece carrier with resepct to the machine tool, and to lock the carrier in position within the elongated hollow body to provide for exact index alignment.

In a preferred form of the invention, rotation of the shaft is caused by providing, on the outside thereof, an inclined thread which cooperates with an axially moving spindle nut. Upon movement of the spindle nut, for example over predetermined distances, by hydraulic cylinder-piston arrangements, the shaft will be rotated over limited angular distances to provide for indexing of the carrier.

The head is releasably aligned, in accordance with a feature of the invention, by forming an internal portion, connected with the head, with a profiled end face which is releasably engagable with another profiled end face to match, so that, upon relative engagement of the profiled end faces, the circumferential position of the element will be fixed.

The elongated hollow body can be formed with a smooth continuous outer wall, so that work units, machine tools, and the like can be secured directly to the outside thereof. This is an advantageous arrangement since the distance between the indexing carrier, or indexing drum, and the work piece secured thereto, and the spindles of the machine tool secured to the smooth outer surface of the elongated carriers will always be the same. Thus, tolerences which always are present if the indexing arrangement and the operating machine tools are separately mounted on the machine tool base, can be avoided. Thus, the hollow elongated body may, itself, form the support for working heads of the machine tool, avoiding inaccuracies, distortions due to mechanical stresses and vibration.

The apparatus in accordance with the present invention can be so arranged that the hydraulic operating force, to turn the shaft on which the indexing drum is located, does not have to provide for exact centering and precise index position. Rather, a separate centering arrangement is provided to ensure final accurate index position of the work piece with respect to the working heads, and which provide for accurate alignment of the chuck, or switching drum with respect to the hollow, elongated body. By locking the indexing drum in predetermined position with respect to the walls of the hollow body, the indexing arrangement itself need not be made to extreme accurate requirements since the final, index position will not be determined thereby. Thus, it is not necessary to provide a Geneva cross movement. The embodiment of the invention which includes the helical thread and the spindle nut can readily be arranged for placement within the hollow tubular body of limited diameter, which, when controlled, for example by hydraulic controls, provides for short switching or stepping times and, since the longitudinal displacement of the spindle nut can be controlled, for a high degree of flexibility in use. By changing the axial feed of the spindle nut, the angle about which the working drum, or the machine tool turns, can readily change. Since the exact index position of the indexing drum, at the work station, is carried out by the centering and alignment means, rather than by the indexing apparatus itself, the accuracy of the machine is maintained regardless of the angular displacement of the indexing, or the indexing steps.

The invention will be described by way of example with reference to the accompanying drawings, wherein.

Figure 1:
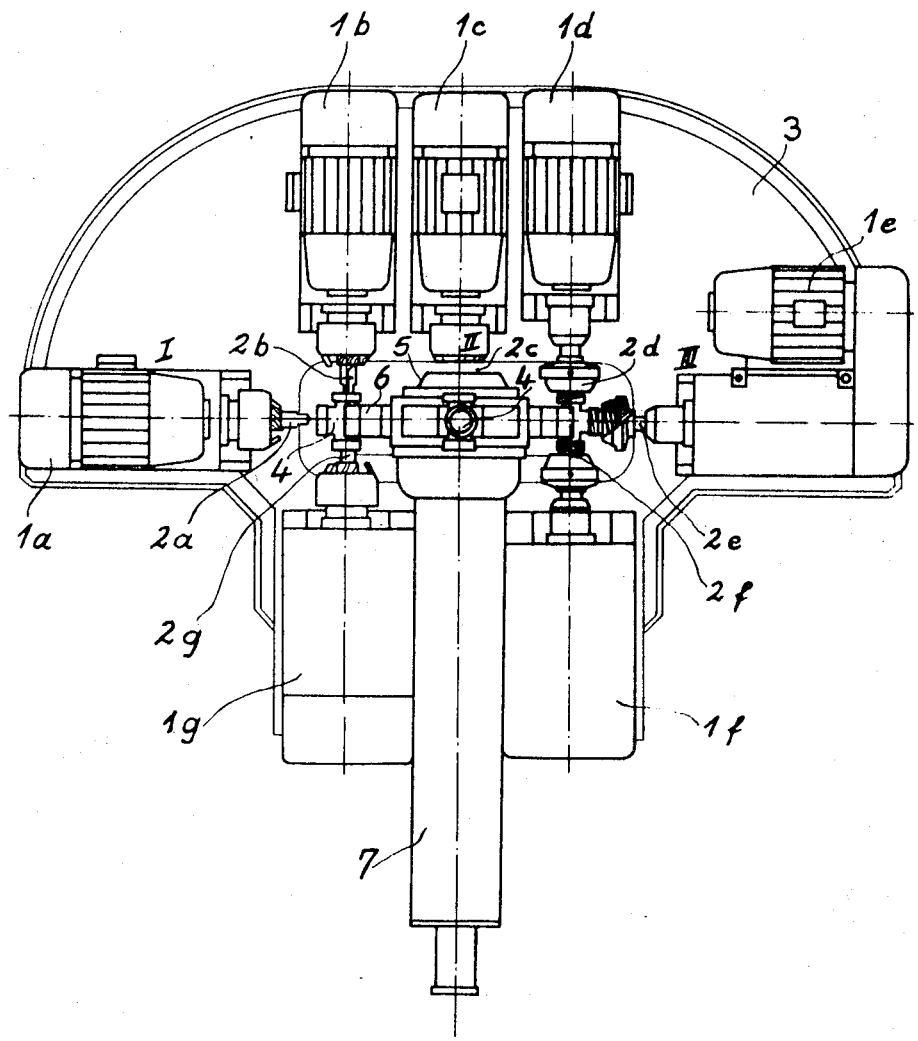
FIG. 1 is a top view of the automatic tool machine.

The machine tool, generally seen in FIG. 1, has seven operating units 1a to 1g, each one having a work spindle 2a to 2g, which can project and retract and which carries at its end a machine tool to work a work piece, such as drills, bores, reamers, taps, cutters for rotary cutting, or the like. The drive spindles of the various working units are driven by associated electric motors.

The working heads 1a to 1e are secured to a base frame 3. Their working spindles 2a to 2e are directed to the work pieces 4, secured to the circumference of an indexing drum 5 by means of holding arrangement 6, or the like. The indexing drum 5 can index, in steps, so that each one of the work pieces 4 pass by the various work stations indicated at I, II, III, respectively. Besides the three working stations along the circumference of the drum, various other work stations may be provided, one of which usually forms a loading station and the other an unloading station.

Indexing of drum 5 is achieved by means of a drive mechanism to be explained in detail below. The drive mechanism is located within a rigid, steady non deformable hollow body 7 having a smooth outer wall, as best seen in FIG. 1. A pair of work units 1f, 1g are directly secured to the outer wall of hollow body 7. The distance of the spindles 2f, 2g from the circumference of the drum 5 is thus entirely independent of the tolerances, distortions, or other inaccuracies introduced by the machine frame 3. The body 7, together with the associated work heads 1f, 1g, and the indexing drum 5 secured thereto, is secured to the base frame 3, for example by means of bolts.

A hollow elongated shaft 8 (FIG. 2) is rotatably journalled within the hollow body 7. Shaft 8 carries at one end a head plate 9, forming the front end of the hollow body 7 and additionally accepting the indexing drum, indicated in FIG. 2 only by chain-dotted line 10, and described in greater detail below.

Figure 11:
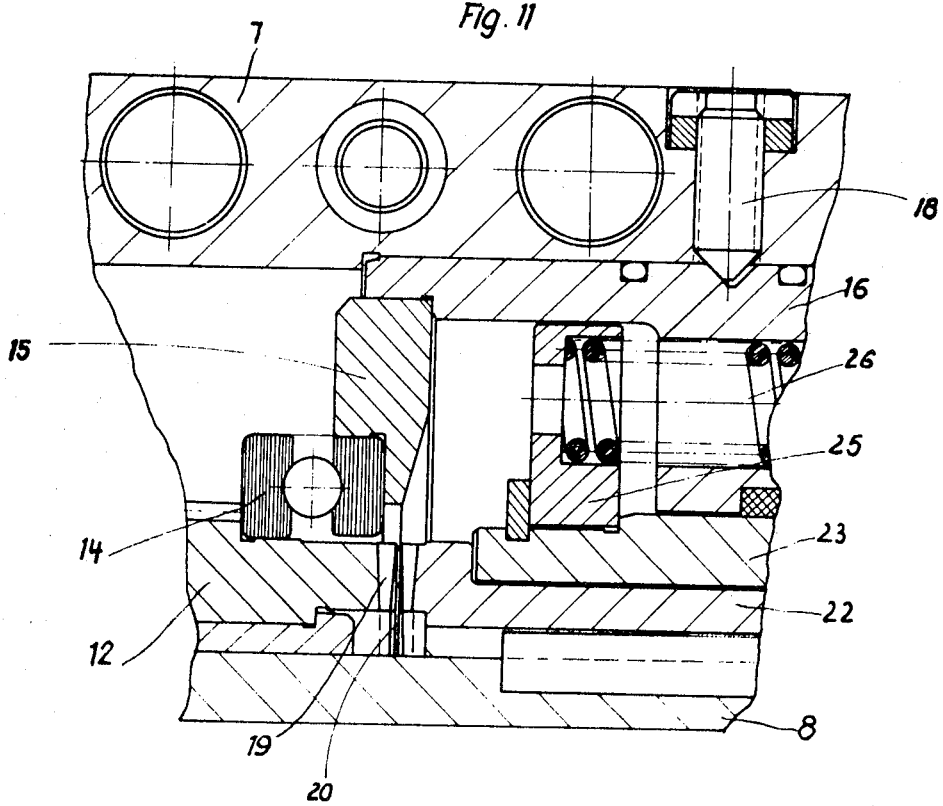
FIG. 11 is a fragmentary detail view of the portion of FIG. 2 within the circle XI in FIG. 2.

A rotatably journalled sleeve 12, having its outer circumference formed with inclined, spiral teeth or thread 13 surrounds hollow shaft 8 and is journalled thereon by means of sleeve bearings 11. Sleeve 12 can bear in axial direction against a thrust bearing 14. Thrust bearing 14 bears against a holding plate 15 which is held at its outer circumference by a sleeve 16 (FIG. 11) and fixed to the wall of the hollow body 7. Sleeve 16 is set into the hollow body 7 to be sealed against liquid therein (see O-rings, FIG. 11) and is held therein by means of set screws 18.

Figure 10:
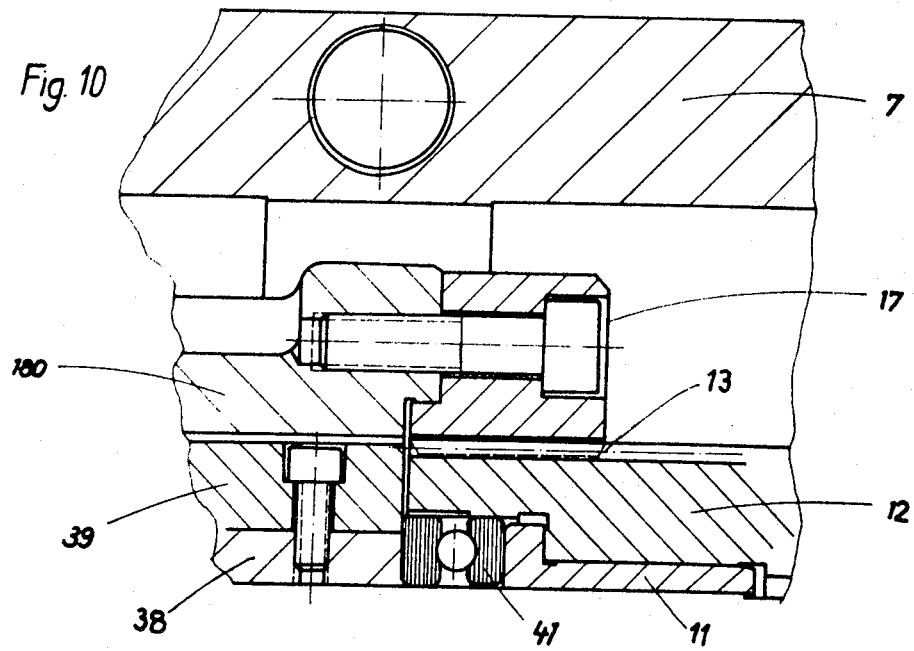
FIG. 10 is a fragmentary sectional view of the elements within the circle X of FIG. 2

A spindle nut 17 (FIG. 10) surrounds sleeve 12. Spindle nut 17 has a corresponding, matching inclined, spiral thread, and is secured to an axially movable tubular member 180, restrained against rotation with respect to the hollow body 7. If the nut 17 is moved from the position shown in FIGS. 2 and 10 towards the right, sleeve 12 is rotated in clockwise direction. The axial forces are counteracted by the thrust bearing 14. To transmit rotary motion to the hollow shaft 8, sleeve 12 is formed with end or facing gear teeth 19 (FIG. 11), matching with respective teeth 20 formed in a coupling part 22, which is secured against relative rotation by connection to shaft 8 by means of a wedge 21. Coupling portion 22 is connected to a hydraulic piston 23; it is rotatable in, but axially fixed with respect to, piston 23. Hydraulic piston 23 is longitudinally movable in a cylinder chamber 24 formed within the elongated body 7. Hydraulic piston 23 has a ring 25 (FIG. 2, 11) applied thereto which bears against compression springs 26, symmetrically located around the circumference thereof, and bearing against a projecting ring-shaped flange of sleeve 16. Springs 26 are biased to maintain the end teeth 20 of the coupling part 22 engaged with the end facing teeth 19 of sleeve 12. The two end teeth can be brought out of engagement by applying pressure fluid into the cylinder chamber 24 over a stub connection 28, counter the force of springs 26.

Figure 9:
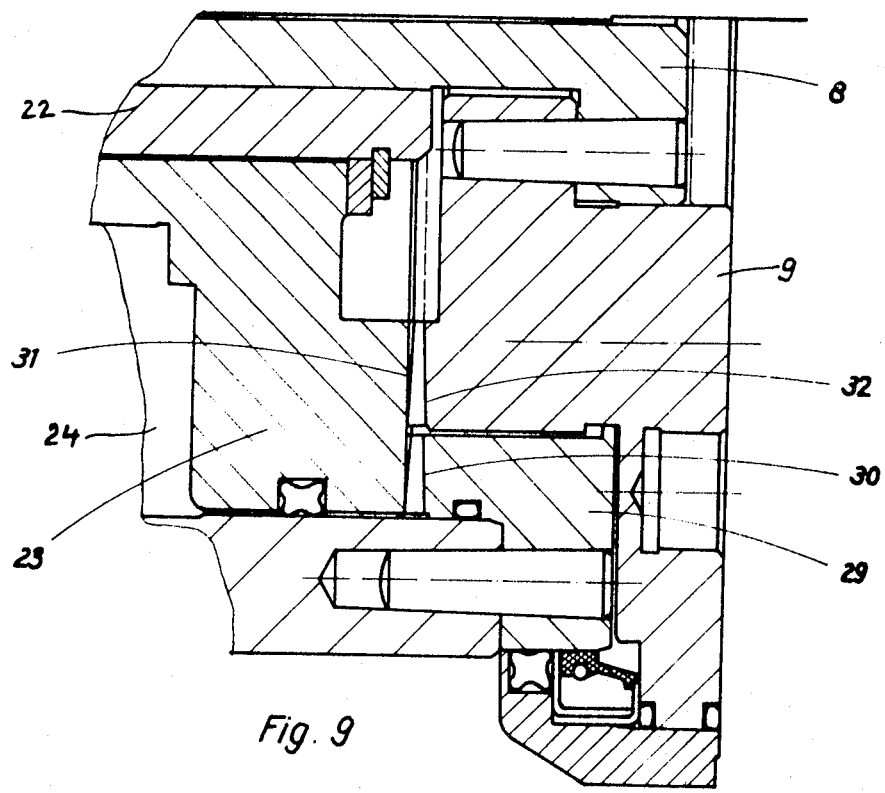
FIG. 9 is a fragmentary sectional view to a greatly enlarged scale of the subject matter indicated within the circle IX of FIG. 2.

The hydraulic piston 23 effecting coupling of the sleeve 12 with the hollow shaft 8 additionally forms part of a locking arrangement for the hollow shaft 8 and the indexing drum 10 (FIG. 9). The wall of the body 7 has a ring 29 fixedly secured thereto, for example by screws. Ring 29 carries end tooth gears on its internally facing end face, as seen at 30, which match a respective gearing 31 of the associated face of the hydraulic piston 23. The hydraulic piston 23 will be properly positioned, that is, will be in proper indexed positioning alignment when the teeth 30, 31 are in matching engagement. Ring 29, carrying end gear teeth 30 will form a counter element for piston 23 and its gearing 36. The head plate 9, screwed to the hollow shaft 8 likewise has at its inner end face a corresponding gearing 32, which can be brought into engagement with the gearing 31 of the hydraulic cylinder 23. This locks the head plate 9 with respect to the hydraulic piston 23, and, over ring 29, to the body 7 forming the housing.

The end remote from the head 10 of the hollow body 7 (FIG. 2) is closed off by a closing plate 33, screwed thereto, in which the hollow shaft 8 is rotatably journalled, and which is formed with a central cylinder bore 34. A hydraulic piston 35, slidably secured to hollow shaft 8, can operate in bore 34. Pressure fluid is supplied to the cylinder bore 34 over connecting stub 36. The second hydraulic piston 35 is arranged to draw the hollow shaft 8 towards the left in FIGS. 2, 3, when pressure fluid is applied to cylinder bore 34.

Operation: If the indexing head 10 is to be indexed to the next step from the position shown in FIG. 2 then first cylinder chamber 24 is vented, or pressure released therefrom. Springs 26 move the hydraulic piston 23 towards the left (FIGS. 2, 11) to couple the piston 23 over the facing gearing 19, 20 (FIG. 11) with sleeve 12. Simultaneously, the face gearing 30, 31, (FIG. 9) is out of engagement. Spindle nut 17 is moved to the right from the position shown in FIGS. 2 and 10 (by apparatus to be described) thus rotating sleeve 12 about the inclined thread 13 by a predetermined angular rotation, depending on the length of the axial path of spindle nut 17. Simultaneously, hollow shaft 8, and with it the plate 9 and the attached indexing head are carried along over coupling element 22. The amount of the angular angle is so selected that the work piece 4 secured to the indexing drum 10 approximately reaches the next adjacent work station.

Figure 2:
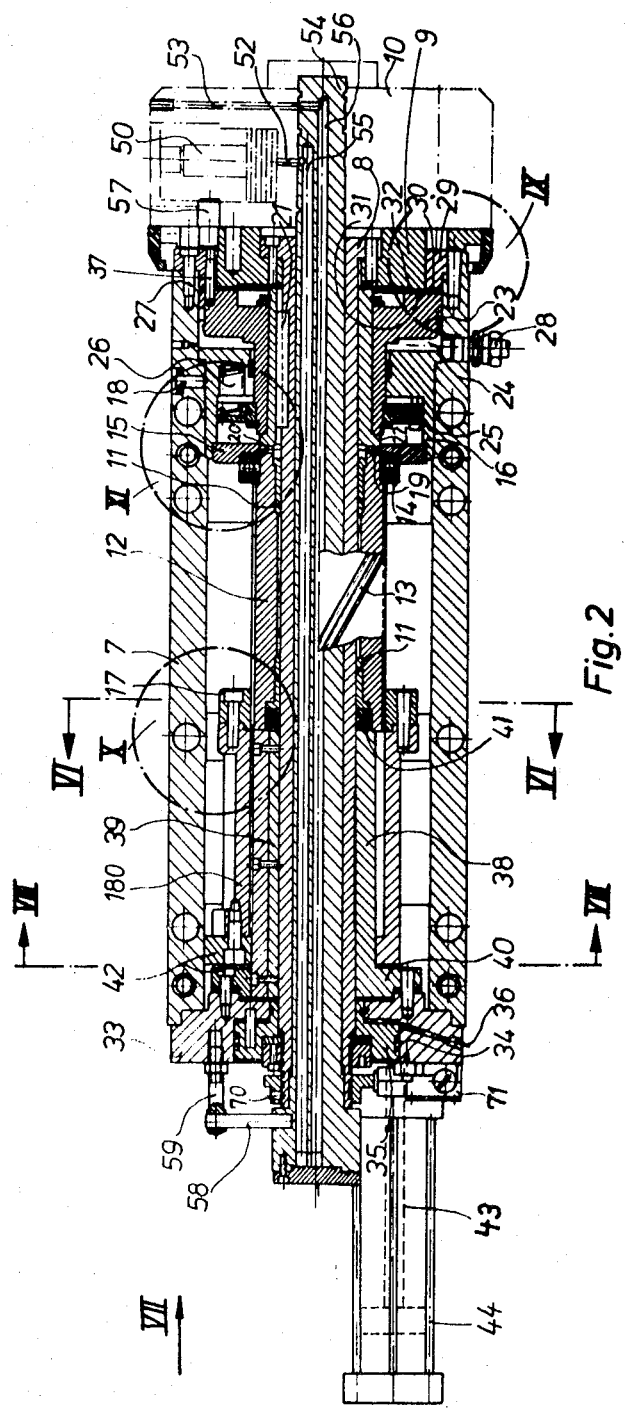
FIG. 2 is a longitudinal cross sectional view of the indexing arrangement in accordance with FIG. 1, along line II—II of FIG. 7, and to a reduced scale.
Figure 3:
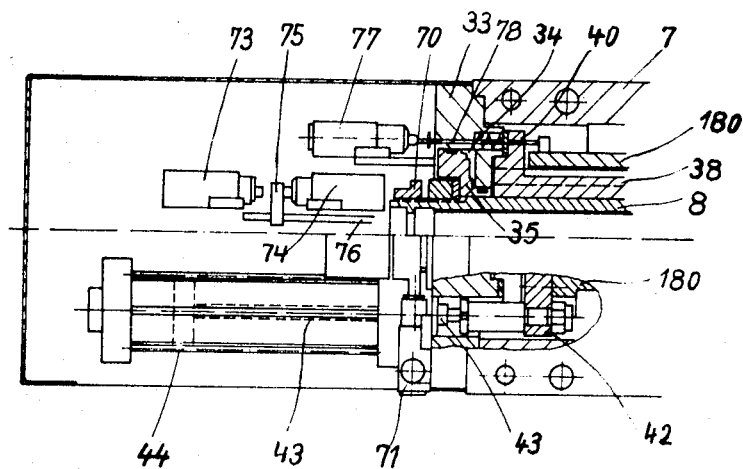
FIG. 3 is a fragmentary longitudinal view of the rear portion of the indexing arrangement, in vertical cross section, and to a different scale, taken along line III—III of FIG. 7.
Figure 6:
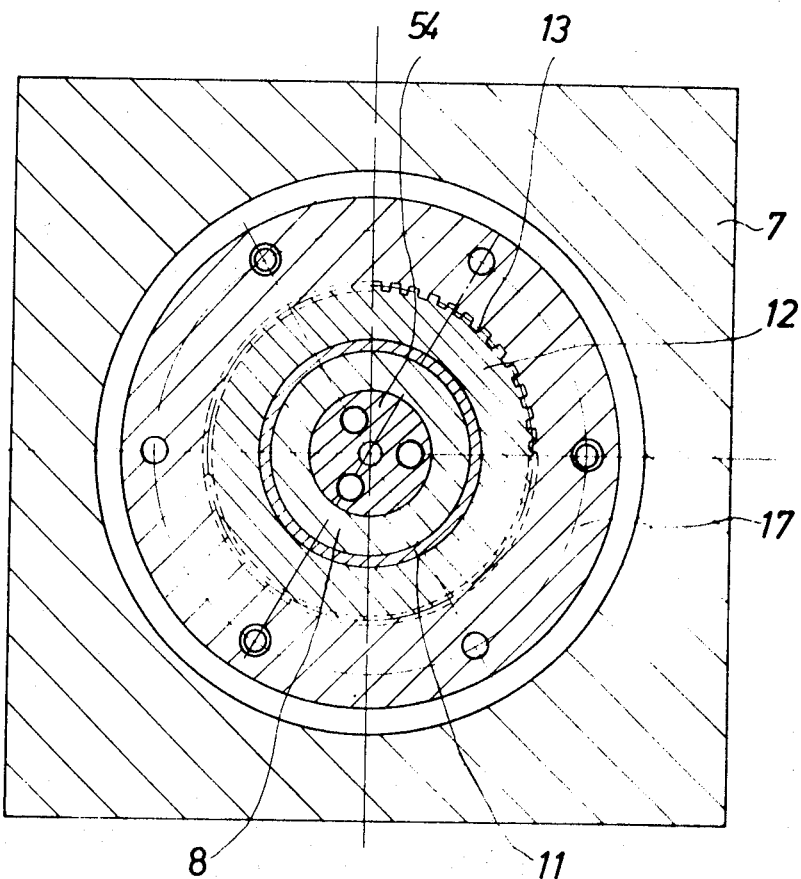
FIG. 6 is a transverse sectional view of the drive, along lines VI—VI of FIG. 2.

As soon as hollow shaft 8 is stopped, cylinder 24 has hydraulic pressure fluid applied thereto, so that the hydraulic piston 23 will move to the right (FIGS. 2, 9 and 11) until its facing threads or gear teeth 31 match with the facing teeth 30 of the fixed rings 29 (FIG. 9). The hydraulic piston 23 is thus placed in exact circumferential alignment; due to movement of the hydraulic piston 23, the face gearings 19, 20 (FIG. 11) have been brought out of engagement, releasing the connection between sleeve 12 and the coupling element 22. Upon application of pressure fluid into cylinder bore 34, the second hydraulic piston 35 is moved, together with the hollow shaft 8 towards the left (FIGS. 2, 3). The effect of such leftward movement is to bring the inner facing surface of plate 9, with its teeth 32 (FIG. 9) in locking engagement with the teeth 31 of the piston 23, already positioned by engagement of its teeth 31 with the teeth 30 of the fixed ring 29. This insures proper positioning of the hollow shaft 8 and thus the plate 9, carrying the indexing drum 10, in rigid alignment with respect to the walls of the hollow body 7. Spindle nut 17 can be returned to its starting position, the uncoupled sleeve 12 being freely rotatable with respect to the hollow shaft 8.

The face gears 31, 32 and 30, 31, respectively provide desired angular alignment. Upon the final axial movement, during which the teeth are brought in engagement, the sides and flanks of the teeth provide for accurate angular positioning.

Rather than forming end gears or the like, other centering arrangements, such as prisms or the like may be used; if desired, tapered or part-cylindrical engagement pins can likewise be provided.

The circumferential distribution of teeth 19, 20 and 30, 31, 32 must have a fixed relationship towards each other. To prevent torsion of the hydraulic piston 23 with respect to the hollow body 7, a spline 37 is provided, (FIG. 2).

Figure 8:
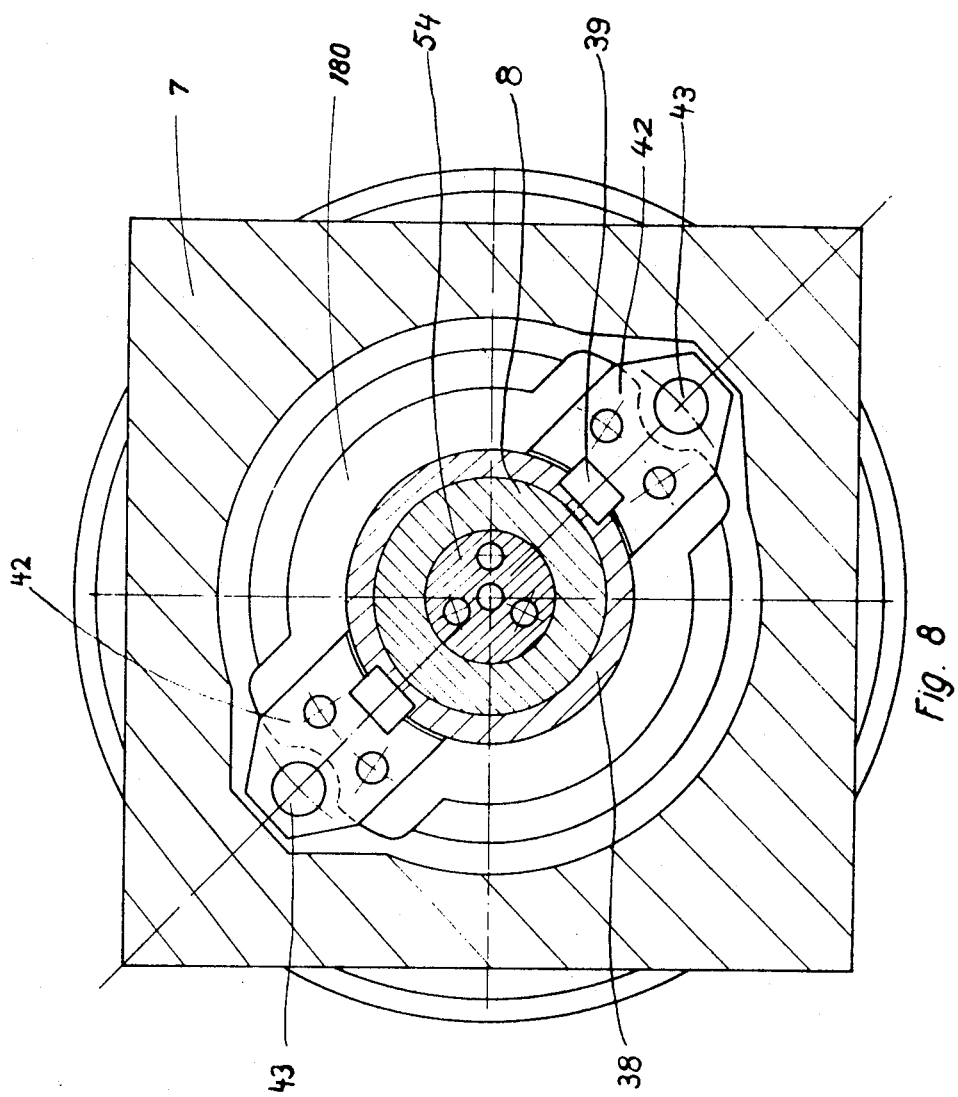
FIG. 8 is a transverse sectional view along line VIII—VIII of FIG. 2.

Spindle nut 17 is driven by means of a hydraulic feed arrangement connected to tubular element 180 (FIGS. 2, 3, 8). Element 180 is screwed to spindle nut 17 and slidably located on a bearing sleeve 38 (FIG. 3, 8) which carries screwed wedges 39 fitting into corresponding grooves of the element 180, and preventing its rotation. Bearing sleeve 38 is connected over a ring-shaped flange 40 with cover plate 33, for example by screws, and thus connected to the walls of the hollow body 7 without permitting relative rotation with respect thereto. Sleeve 12 bears against thrust bearing 41 (FIG. 10) against the inner facing surface. A pair of diametrically oppositely located pressure element 42 (FIG. 8) are screw-connected to sleeve 180, and connected with piston rod 43 of a pair of hydraulic cylinders 44, secured to the outside of plate 33. The piston rods extend through suitable apertures in the cover plate 33.

Figure 7:
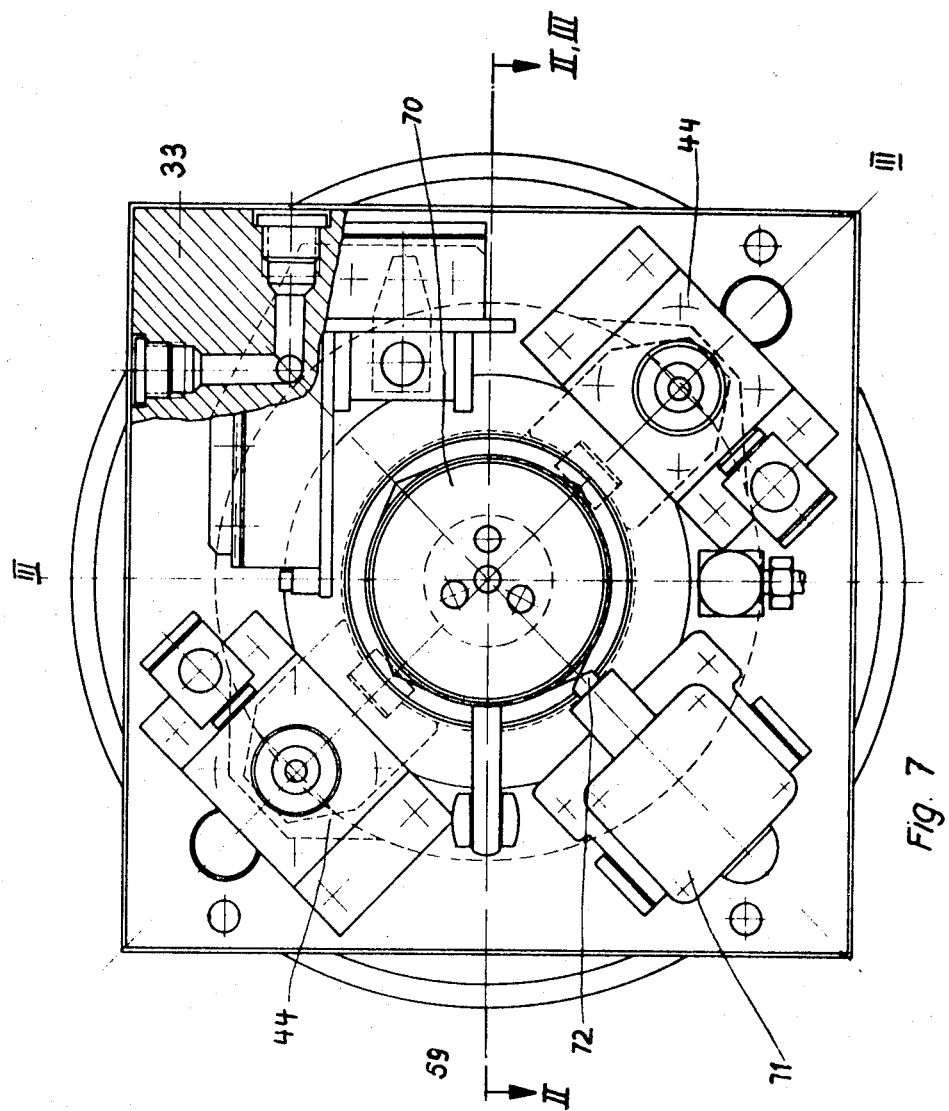
FIG. 7 is an end view along arrow VII of FIG. 2.

The indexing operation is, on the whole, controlled by hydraulic valves, which govern supply of pressure fluid to the hydraulic cylinders 44 to move spindle nut 17, and supply of pressure fluid to cylinders 24, 34, to lock shaft 8 and indexing head 10 in position. To provide for exact indexing movement, end, or limit switches are provided. Shaft 8 is formed with a cam 70 (FIGS. 2, 3, 7) which cooperates with a limit switch 71, the operating element of which is shown at 72. Limit switches 73, 74 (FIG. 3) are located in the region of the rear plate 33, controlled in dependence on axial movement of the hydraulic piston 23. Hydraulic piston 23 is connected over an operating rod 76 to an operating element 75 controlling limit switches 73, 74, rod 76 extending through a suitable opening in cover plate 33. Axial movement of nut 17 is controlled by a limit switch 77 (FIG. 3), having an operating element 78 extending likewise through end plate 33 and capable of being coupled with tubular element 180.

Figure 5:
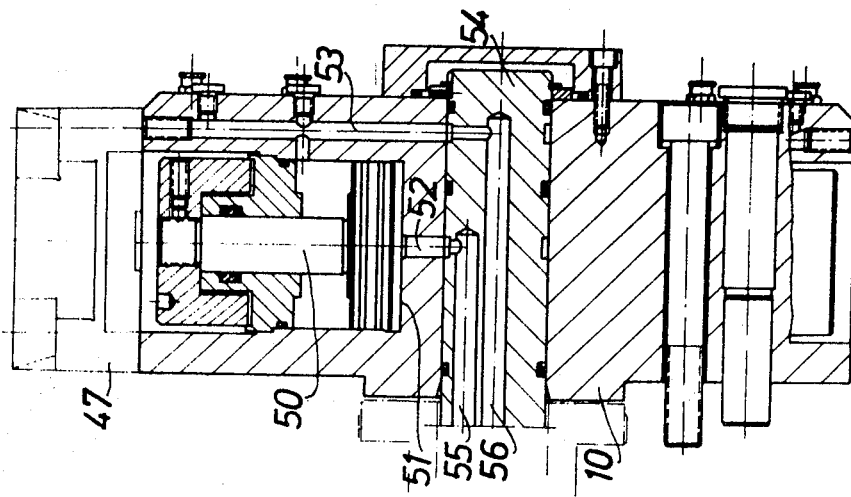
FIG. 5 is a transverse section view along line V—V of FIG. 4.
Figure 4:
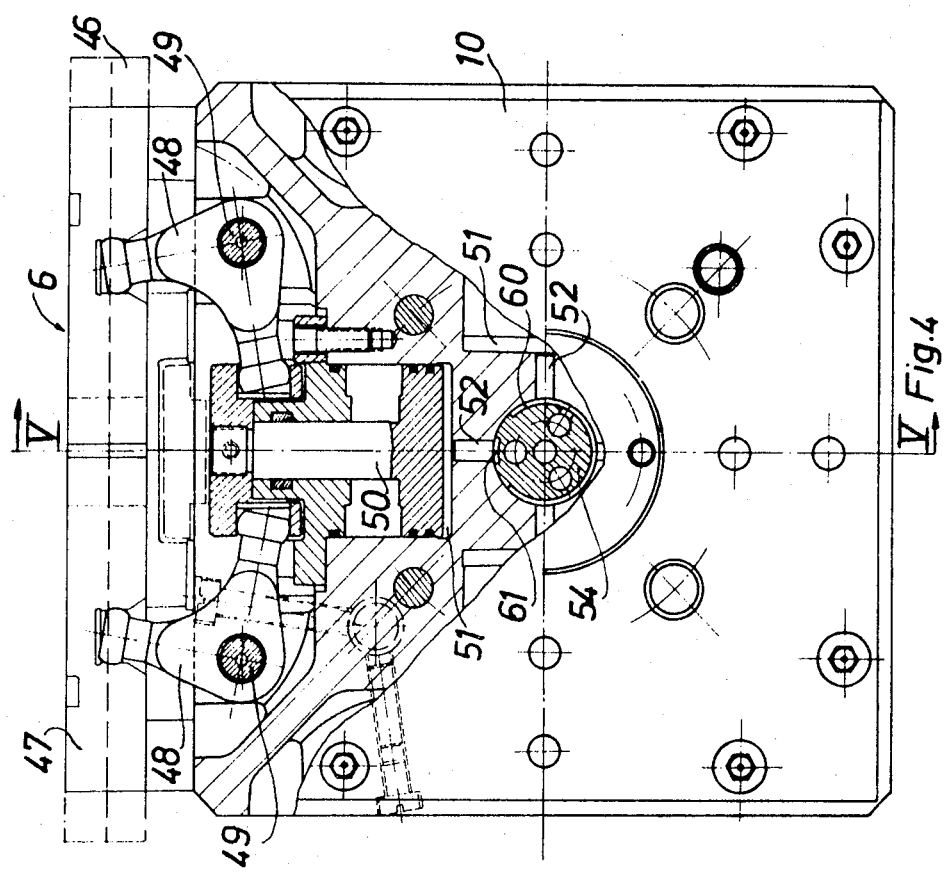
FIG. 4 is a partially cut away, partially plan sectional view of the tool carrier.

The holding arrangement for the work pieces is best seen in FIGS. 4 and 5. Clamping, or chucking arrangements 6 are provided on the indexing drum head 10 to clamp the workpieces 4 (FIG. 1) therein. These holding and clamping arrangements 6 essentially comprise a pair of mutually shiftable clamping jaws 46, 47, which can be moved by means of levers 48, swingably located about stub shafts or axles 49 in the head 10. Swing motion to the levers 48 is imparted by a hydraulic piston 50, only one of which is shown. Hydraulic piston 50 is guided for sliding movement in a cylinder chamber 51, connectable with a pressure fluid line over a duct 52. A pressure fluid duct 53 is provided which ends above piston 50 in cylinder chamber 51 to reverse movement of the piston 50.

Cylinder chamber 51 is supplied with pressure fluid centrally through ducts 55, 56 formed in a shaft 54 extending through the central bore of the hollow shaft 8. Pressure fluid can be applied at the end remote from the indexing drum 10 to the ducts 55, 56. As seen in FIG. 2, the arrangement is such that the indexing head 10 can be attached to the projecting end of shaft 54 with a liquid tight sliding fit, and is placed by means of pins 57 in exactly aligned position with respect to plate 9; it can then be secured by screws or other means not shown. When the head 10 is attached, the ends of duct 55, 56 terminate at the ducts 52, 53 formed in the head 10, so that the pressure fluid can be applied to cylinder chambers 51, or removed therefrom. Shaft 54 remains stationary during indexing motion of the hollow shaft 8 and with it of the indexing drum head 10. A pin 58 (FIG. 2, left side) extends outwardly from the shaft 57 and is secured by means of a holder 59 rigidly to cover plate 33. In order to provide for a supply of pressure fluid to cylinder chambers 51 as the head 10 indexes, ducts 55, 56 are formed at the circumference of shaft 54 as ring-ducts 60, 61 which communicate with ducts 52, 53. By suitably forming and dimensioning the ring ducts 60, 61, application of pressure fluid to cylinder chamber 51 can be controlled in dependence on the rotary motion of the indexing head 10, as will be apparent from a consideration of FIG. 4. The length of the ring duct 61, in circumferential direction, is compartively short, whereas the ring duct 60 is comparatively long. Thus, duct 52 can have pressure fluid applied to lead to cylinder chamber 51 only in a predetermined position of shaft 54 with respect to the drum head 10, whereas duct 53 applied pressure fluid over the ring-shaped duct 61 over a longer angular distance. Duct 52 receives pressure fluid only to release the holding arrangement 6 which will occur only at the loading, or removal stations or positions.

The indexing head 10 can be easily replaced and removed from the head plate 9, so that various types of heads can be fitted on the tool machine, depending on the characteristics of the work pieces to be worked. Specifically, various indexing drums can be used which have 4, 6, 8 or more chucking arrangements on their circumference. Hydraulic control of these chucking and holding arrangements of the various indexing drums can readily be accomplished in the manner shown in connection with the two holding chucks 46, 47, FIGS. 4 and 5. All that is necessary is to remove the indexing head, and shaft 54 which can merely be pulled out from the central bore of shaft 8, and replace shaft 54 and indexing head 10 with a suitable matching assembly.

The embodiment of the invention above described assumes that the shaft 8 and the indexing head 10 is moved by an axial motion of spindle nut 17 towards the right in FIG. 2, the return motion of spindle nut 17 not transferring any motion to shaft 8. The arrangement can readily be reversed, in such a manner that rotary motion of shaft 8 occurs when spindle nut 17 moves towards the left in FIG. 2, and motion towards the right then is merely return motion guiding nut 17 back into its quiescent, or starting position.

The present invention has been described in connection with a multiposition working head on which work pieces can be located to be operated on by movable machine tools, for example driven by motors. The arrangement can be reversed in that tool heads can be placed on the indexing drum, and work pieces located with respect to the tools, the work pieces being rotated with respect to the tools as they are fixed in position. Various changes and modifications may be made within the inventive concept to adapt the invention to specific requirements of machining which the machine tool is to carry out.

We claim:

1. In an automatic tool machine, a multi-position indexing arrangement having a plurality of work stations at which a work piece is to be selectively aligned with a working tool, the arrangement having an indexable working head in which the position of the work piece can be indexed for machining the work piece with respective working tools, having a workpiece carrier (5) and means securing the workpiece in the carrier; said arrangement comprising an elongated, hollow body (7) secured to the machine tool;

a rotatable shaft (8) located within the hollow body, the work piece carrier (5) being secured to the shaft (8);

operating means located in axially staggered position within the hollow body and acting on the shaft to cause relative rotation of the shaft for a limited angular distance with respect to the hollow body to approximately align the work piece carrier (5) at a predetermined position;

and self-centering releasable alignment and centering means (22, 30, 31, 32) interconnecting the carrier (5) and the hollow body (7) for exact positioning of the work piece with respect to the hollow body and locking said carrier (5) in position with respect to the elongated hollow body (7) and including a movable clutching element (22, 23) movable axially in the hollow body (7) between a first position connecting the operating means with the shaft and a second position connecting the shaft (8) in aligned, centered position to the hollow body.

2. Machine tool according to claim 1 wherein the outer surface of the elongated hollow body (7) is substantially smooth;

and means are provided securing at least one working head (1f, 1g) to the outside of the elongated hollow body, positioned to effect working operations on a work piece on the work piece carrier.

3. Machine tool according to claim 1 wherein the operating means to rotate the shaft comprises means forming an inclined spiral thread (13) coupled to said shaft (8);

a spindle nut (17) engaging said thread, said spindle nut being located within said hollow body and restrained against rotation;

and means (44) axially displacing said spindle nut (17).

4. Machine tool according to claim 3 wherein the length of the displacement path of said spindle nut (17) is adjustable.

5. Machine tool according to claim 3 wherein the means forming an inclined spiral thread comprises a sleeve (12) surrounding the shaft having the spiral thread (13) formed on the outside thereof;

and means coupling the sleeve and said shaft together.

6. Machine tool according to claim 5 including a pair of thrust bearings (14, 41) locating the sleeve (12) within the elongated body and maintaining said sleeve in fixed axial position within said elongated body.

7. Machine tool according to claim 1 wherein the releasable centering means comprises means (34, 35) axially shifting said shaft (8);

radially aligned profile positioning means (30, 31, 32) are secured to the shaft and to the hollow elongated body (7) respectively and engagable upon axial shifting of the shaft (8) to locate the shaft in aligned radial position upon interengagement of the profile positioning means;

the clutching element locking said shaft in said aligned position.

8. Machine tool according to claim 7 wherein the profile positioning means (30, 32) are end facing teeth.

9. Machine tool according to claim 7 including a counter element (FIG. 9, 29) internally, fixedly secured to the hollow body (7) said counter element being formed with an axially facing profiled end face (30);

a ring-shaped projection (9) secured to said shaft (8) and having an axially facing profiled end face (32) located substantially concentrically with respect to said counter element;

the clutching element (23) being located within said hollow body and having an axially facing profiled end face (31) facing both said profiled end faces (30, 32) of said counter body and said ring shaped projection (9) for selected engagement with and locking together of both said end faces of said clutching element.

10. Machine tool according to claim 9 wherein said clutching element comprises a coupling sleeve (22) rotatably located in said elongated hollow body (7); means are provided releasably coupling said sleeve for rotation with the shaft (8);

said coupling sleeve (22), counter element and ring shaped projection being relatively rotatable when the profiled end face of the clutching element is out of engagement with the profiled end face of the counter element (29) and the ring shaped projection (9).

11. Machine tool according to claim 9 wherein the clutchint element (23) is a hydraulic piston;

and spring means are provided bearing against said clutching element to bias the clutching element, in the absence of hydraulic pressure bearing on the clutching element forming the piston, into a predetermined position within the elongated hollow body.

12. Machine tool according to claim 7, including means axially shifting the shaft (8) comprising a hydraulic piston-cylinder arrangement having one element (piston 35) connected to the shaft and having the other element thereof (cylinder 34) located at an end face (33) of the hollow body (7).

13. Machine tool according to claim 3 wherein the means axially displacing the spindle nut comprises an operating member (180) secured to the spindle nut and located for axial movement, but restrained against rotation, in the elongated hollow body (7);

and a hydraulic cylinder-piston arrangement (44) within said elongated body (7) connected to the operating member to provide for axial displacement of said operating member.

14. Machine tool according to claim 3 wherein the spindle nut is displaceale forward or backward with respect to the ends of the elongated body to effect rotation of the shaft (8) in either direction.

15. Machine tool according to claim 1 wherein the shaft (8) is formed with a bore, so that the shaft (8) will be a hollow shaft;

a central shaft (54) is located in said bore (8) of said hollow shaft, and projecting beyond the elongated hollow body (7), said work piece carrier (5) being carried by the axially extending portion of said central shaft.

16. Machine tool according to claim 15 wherein the work piece carrier includes an indexing drum holding chucking elements (6) to carry work pieces, said indexing drum being removably secured to said shaft (54); and means exactly aligning the indexing drum (10) and the hollow shaft (8).

17. Machine tool according to claim 15 wherein the work piece carrier includes an indexing head (10) having movable chucking means (6) thereon;

a hydraulic cylinder (50, 51) in said indexing head, and a piston movable in said cylinder, the piston being linked to said chucking means for movement thereof;

and pressure fluid duct means (55, 56) formed in the central shaft (54) communicating with said hydraulic cylinder to operate said cylinder for tightening and releasing said chucking means.

18. Machine tool according to claim 17 wherein supply ducts (52, 53) interconnect the hydraulic cylinder (50, 51) and said ducts (55, 56) in the central shaft, and include ring-shaped ducts, the angular extent of the ring-shaped ducts selectively providing communication at predetermined index positions of said indexing head to provide for automatic operation of said chucking means to closed and released position in dependence on the index position of said indexing head.

19. In an automatic tool machine, a multi-position indexing arrangement having a plurality of work stations at which a work piece is to be selectively aligned with a working tool, the arrangement having an indexable working head in which the position of the work piece can be indexed for machining the work piece with respective working tools, having a work piece carrier (5) and means securing the work piece in the carrier; said arrangement comprising an elongated, hollow body (7) secured to the machine tool;

a rotatable shaft (8) located within the hollow body, the work piece carrier (5) being secured to the shaft (8);

operating means located in axially staggered position with respect to the shaft (8) and acting on the shaft to cause relative rotation of the shaft for a limited angular distance with respect to the hollow body to approximately align the work piece carrier (5) at a predetermined position;

and a self-centering releasable alignment and centering means (22, 30, 31, 32) interconnecting the carrier and the hollow body for exact positioning of the work piece with respect to the hollow body and locking the carrier in position with respect to the hollow body, including an axially facing gear (29, 30) located in alignment with the hollow body (7), and axially movable means (21, 22, 23) having an axially facing gear ring (31) directed opposite to and engageable with said axially facing gear (29) to permit coupling the shaft (8) and the work piece carrier (5) to said axially facing gear (29) and providing for final accurate alignment by engagement of the flanks of said matching axially facing gear (29) and the gear ring (31), upon axial positioning of said movable means to bring said gear (29) andgear ring (31) into engagement.

20. Machine tool accordin to claim 19, wherein the axially facing gear (29, 30) comprises a ring-shaped element, internally, fixedly secured to the hollow ring-shaped (7) and formed with axially facing gear teeth;

a ring-shaped projection (9) secured to said shaft (8) and having axially facing gear teeth (32) located substantially concentrically with respect to said ring-shapeed element;

and wherein the axially movable means comprises a clutching element located within said hollow body (7) and coaxially with said shaft (8) and having axially facing gear teeth, facing the gear teeth of both said ring-shaped element and said ring-shaped projection, for selected engagement with and locking together of both the end faces of the ring-shaped element and the ring-shaped projection with said clutching element, upon axial movement of said clutching element toward said ring-shaped element and ring-shaped projection.

* * * * *